United States Patent
Ford et al.

(10) Patent No.: US 6,576,835 B1
(45) Date of Patent: Jun. 10, 2003

(54) MULTIPLE GANG JUNCTION BOX ASSEMBLY WITH MULTIPLE WIRE CLAMPING DEVICES

(75) Inventors: Gregory H. Ford, Reno, NV (US); Oliver H. Lieder, Carson City, NV (US)

(73) Assignee: OEM Systems Company, Inc., Sparks, NV (US)

( * ) Notice: Subject to any disclaimer, the term of this patent is extended or adjusted under 35 U.S.C. 154(b) by 0 days.

(21) Appl. No.: 10/151,636

(22) Filed: May 17, 2002

Related U.S. Application Data

(63) Continuation-in-part of application No. 09/824,118, filed on Apr. 2, 2001, now Pat. No. 6,395,981.

(51) Int. Cl.$^7$ ................................................ H02G 3/08
(52) U.S. Cl. ........................ 174/50; 174/53; 174/65 R; 174/135; 220/32
(58) Field of Search .................... 174/65 G, 153 G, 174/65 R, 50, 53, 58, 54, 61, 64, 135; 220/3.2, 3.3, 3.5, 3.6, 3.7, 3.8, 3.94, 241, 242, 3.92

(56) References Cited

U.S. PATENT DOCUMENTS

| | | | |
|---|---|---|---|
| 1,929,844 A | 10/1933 | Haas | 247/16 |
| 3,472,945 A | 10/1969 | Trachtenberg | 174/53 |
| 3,587,906 A | 6/1971 | Pepe | 220/3.2 |
| 3,905,484 A | 9/1975 | Dean et al. | 211/184 |
| 4,277,641 A * | 7/1981 | Bauer et al. | 174/65 R |
| 4,288,655 A * | 9/1981 | Lass | 174/65 R |
| 4,304,958 A * | 12/1981 | Neff et al. | 174/65 R |
| 4,306,109 A * | 12/1981 | Nattel | 174/51 |
| 4,316,999 A * | 2/1982 | Nattel | 174/65 R |
| 4,424,406 A * | 1/1984 | Slater et al. | 174/65 R |
| 4,455,449 A | 6/1984 | Rendel | 174/53 |
| 4,591,658 A * | 5/1986 | Bauer et al. | 174/65 R |
| 4,605,816 A * | 8/1986 | Jorgensen et al. | 174/65 R |
| 4,874,905 A * | 10/1989 | Schnell et al. | 174/65 R |
| 4,972,044 A * | 11/1990 | Kropa | 174/65 R |
| 5,177,325 A | 1/1993 | Giammanco | 174/50 |
| 5,486,650 A | 1/1996 | Yetter | 174/53 |
| 5,594,207 A | 1/1997 | Fabian et al. | 174/58 |
| 5,990,439 A | 11/1999 | Pever | 218/156 |
| 6,091,023 A | 7/2000 | O'Donnell | 174/57 |
| 6,177,633 B1 * | 1/2001 | Gretz | 174/153 G |
| 6,310,290 B1 * | 10/2001 | Gretz | 174/135 |
| 6,395,981 B1 * | 5/2002 | Ford et al. | 174/50 |

\* cited by examiner

*Primary Examiner*—Dean A. Reichard
*Assistant Examiner*—Angel R. Estrada
(74) *Attorney, Agent, or Firm*—Flanagan & Flanagan; John R. Flanagan

(57) ABSTRACT

A multiple gang junction box assembly includes a main box and wire clamping devices.disposed in an interior chamber of and attached to the main box. Each wire clamping device includes a clamp housing structure attached to the main box so as to define a passage therethrough into its interior chamber and a clamp member disposed in the housing structure across the passage and flexably bendable at an upper end attached to the main box so as to enable the clamp member to undergo pivotal movement from a closed position toward an open position relative to the passage such that a lower end of the clamp member and a plurality of barbs on the housing structure can assume a locking condition relative to a wire pushed into the main box through passage that prevents the wire from being pulled back through the passage and from the main box.

19 Claims, 9 Drawing Sheets

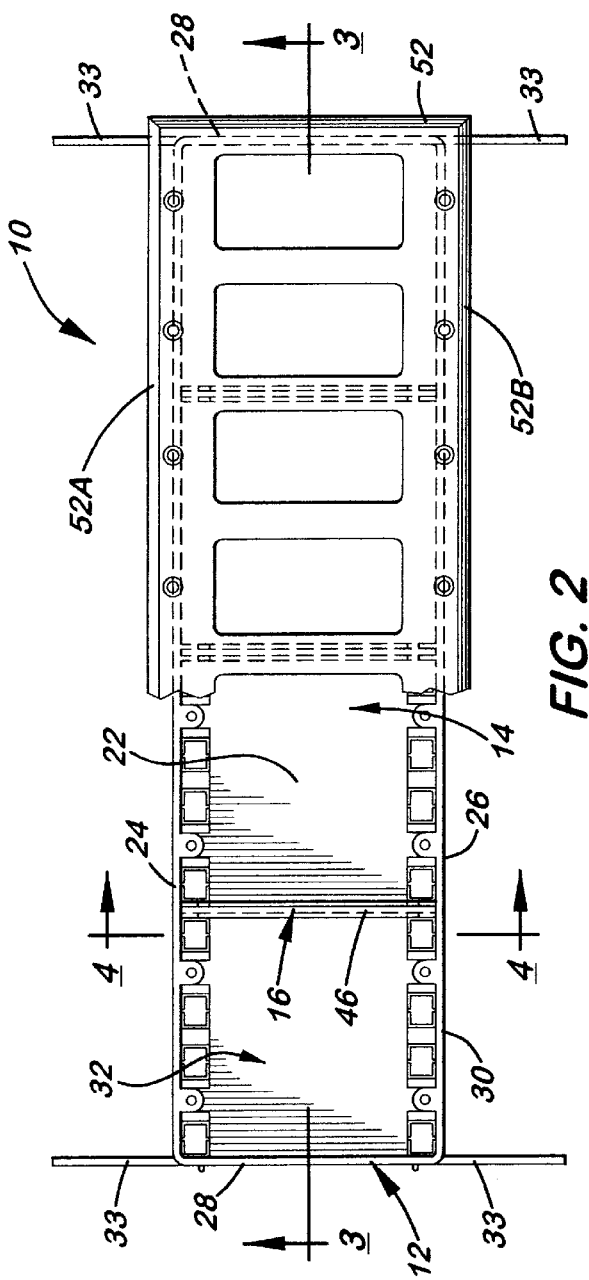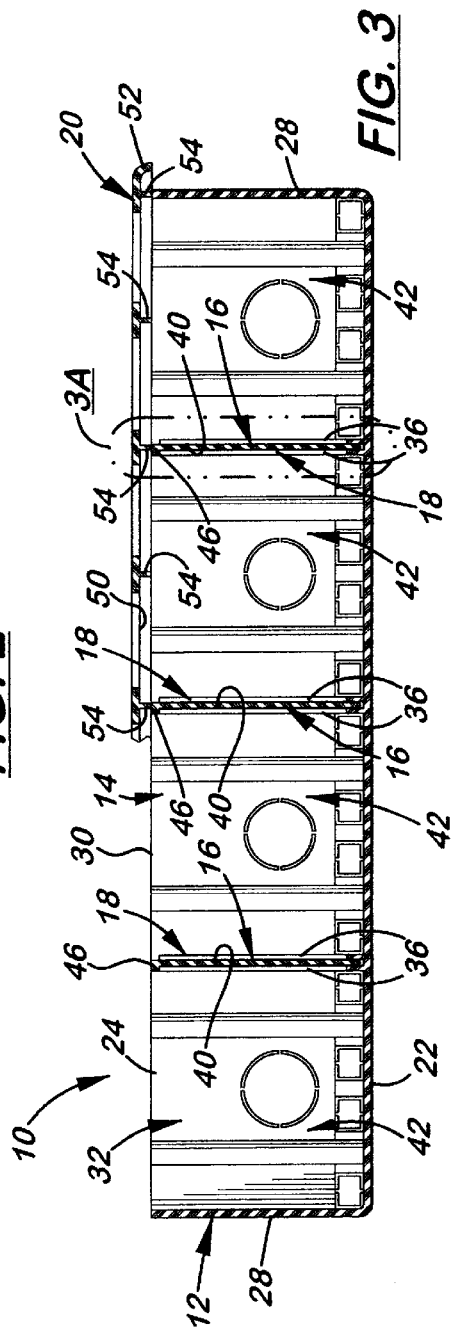

MULTIPLE GANG JUNCTION BOX ASSEMBLY WITH MULTIPLE WIRE CLAMPING DEVICES

This patent application is a continuation-in-part of original U.S. application Ser. No. 09/824,118, filed Apr. 2, 2000 now U.S. Pat. No. 6,395,981.

BACKGROUND OF THE INVENTION

1. Field of the Invention

The present invention generally relates to multiple gang junction boxes and, more particularly, is concerned with a multiple gang junction box assembly having a plurality of wire clamping devices.

2. Description of the Prior Art

Multiple gang junction boxes have long been well-known that generally include a front cover and a rectangular or any other desired shaped box having a rear wall and side walls at the top, bottom and opposite ends of the box which extend forwardly from the rear wall to form an open front which can be closed by the front cover. The rear wall and/or side walls are typically provided with preformed knockouts the removal of which provide openings in the box walls through which electrical wires can pass for connection to devices mounted in the box.

As is well known in the electrical field, Underwriter's Laboratory (UL) code requires that multiple gang junction boxes shall have therein suitable partitions dividing the box into separate compartments which will provide electrical arcing isolation therebetween where the box is to be utilized to house electric devices involving high and low voltage levels. Examples of prior art multiple gang junction boxes having partitioned compartments are the ones disclosed in U.S. Pat. No. 1,929,844 Haas, U.S. Pat. No. 3,472,945 Trachtenberg, U.S. Pat. No. 3,587,906 Pepe, U.S. Pat. No. 4,455,449 Rendel and U.S. Pat. No. 5,594,207 Fabian et al.

Previous attempts to provide multiple gang junction boxes with suitable features that allow for satisfactory entry of wires into the box and division of the box into separate compartments, so as to provide electrical arcing isolation between the compartments and thus meet the UL code requirements and still be economical and easy to manufacture, have not been altogether successful. As a consequence, a need still remains for an innovation which will meet the electrical requirements and still be economical to manufacture.

SUMMARY OF THE INVENTION

The present invention provides a multiple gang junction box assembly designed to satisfy the aforementioned needs. The box assembly has a main box, a plurality of divider panels and a front cover plate which cooperate together to divide and separate an interior chamber of the main box into side-by-side compartments having enhanced electrical arcing isolation of the side-by-side compartments from one another in accordance with the invention of the original patent application cited above. The main box of the assembly has a plurality of wire clamping devices in accordance with the present invention.

Accordingly, the present invention is directed to a multiple gang junction box assembly which comprises: (a) a main box having an interior chamber and a front peripheral edge defining a front opening to the interior chamber; and (b) a plurality of wire clamping devices disposed in the interior chamber of the main box and attached to the main box. Each of the clamping devices includes: (i) a clamp housing structure attached to the main box so as to define a passage through the main box for entry of a wire into the interior chamber of the main box, the clamp housing structure having upper and lower portions located above and below the passage, the lower portion defining at least one outwardly protruding barb; and (ii) a clamp member disposed in the clamp housing structure across the passage therethrough, the clamp member having upper and lower ends and being attached at the upper end of the clamp member to the main box at a location adjacent to the upper portion of the clamp housing structure such that the clamp member is adapted to flexably bend at the upper end thereof so as to enable the clamp member to undergo pivotal movement from a closed position toward an open position relative to the passage in which the clamp member at the lower end thereof is moved away from the barb defined by the lower portion of the clamp housing structure, the clamp member being positioned relative to the upper portion of the clamp housing structure so as to yieldably bias the clamp member to move toward the barb when the clamp member is caused to flexably bend away from the barb in response to a wire being pushed into the main box through the passage from outside of the interior chamber thereof such that the lower end of the clamp member and the barb then assume a locking condition relative to the wire that prevents the wire from thereafter being pulled back through the passage from the interior chamber of the main box.

The clamp housing structure also has a pair of opposite walls attached to the main box and protruding into the interior chamber thereof so as to define the passage between the opposite walls. The upper portion of the clamp housing structure extends between and interconnects upper portions of the opposite walls. The lower portion of the clamp housing structure extends between and interconnects lower portions of the opposite walls. The lower end of the clamp member is formed by front and rear edge portions, thereon which converge toward one another and terminate as a pointed edge on the clamp member. The clamp member has a face with a recess defined therein so as to form a U-shaped raised area on the face of the clamp member providing the clamp member with sufficient structural rigidity such that the clamp member flexably bends only at the upper end thereof. The clamp member also has an upper portion located adjacent to the upper end of said clamp member which is engagable with an abutment surface on the upper portion of the clamp housing structure so as to yieldably bias the clamp member to move toward the barb defined by the lower portion of the clamp housing structure when the clamp member, after the upper portion thereof engages the abutment surface, is further caused to flexably bend away from the barb in response to the wire being pushed into the main box through the passage from outside of the interior chamber thereof such that the lower end of the clamp member and the barb then assume the locking condition relative to the wire that prevents the wire from thereafter being pulled through the passage from the interior chamber of the main box.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 2 is a front elevational view of the assembly of FIG. 1 with all the divider panels installed in the main box.

FIG. 3 is a longitudinal sectional view of the assembly taken along line 3—3 of FIG. 2.

DETAILED DESCRIPTION OF THE INVENTION

Figure 1:
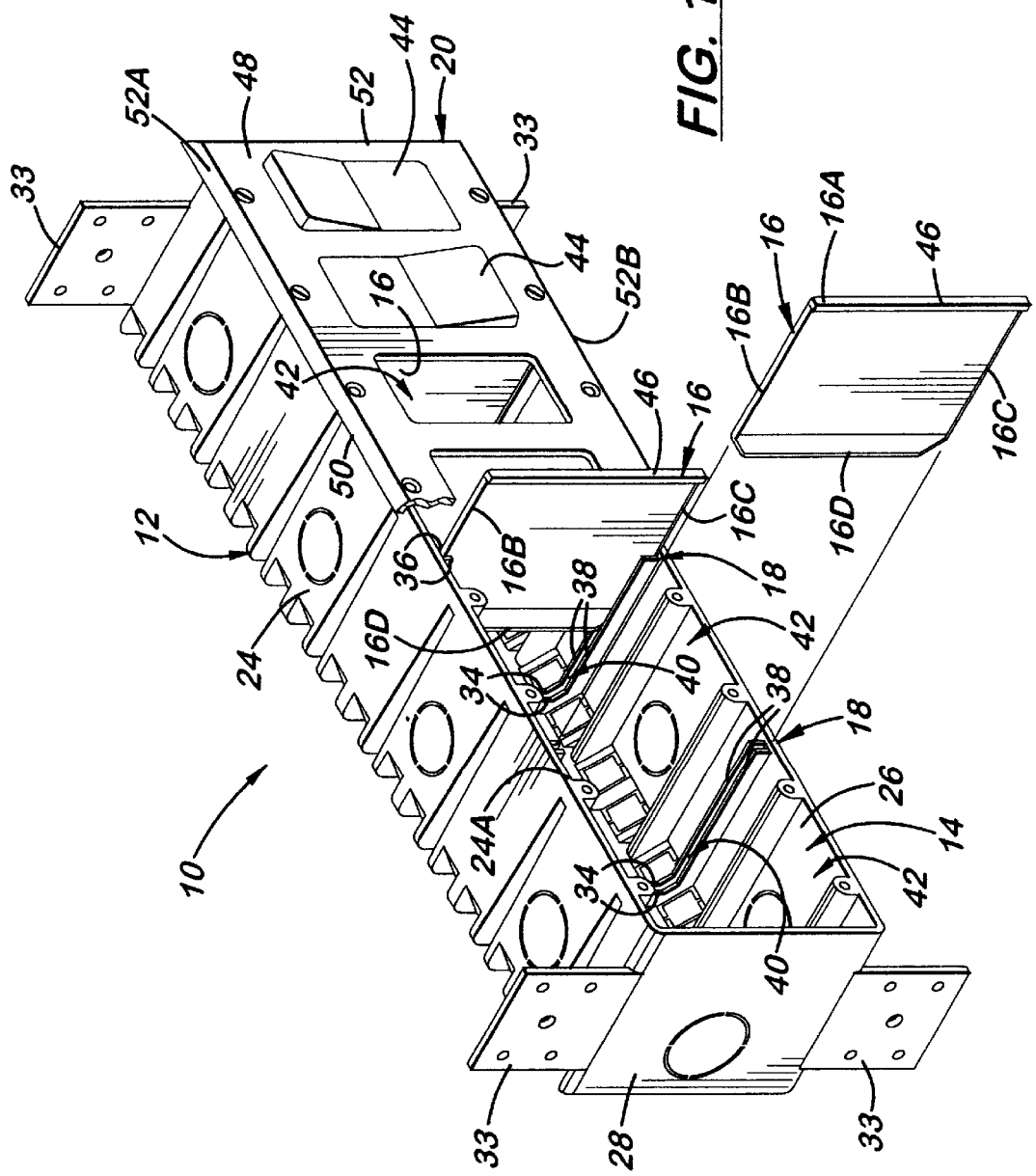
FIG. 1 is a front perspective view of a first embodiment of a multi-gang box assembly constituting the invention of the above-cited original patent application showing a portion of a front cover plate broken away to expose an interior chamber of a main box and showing two of a plurality of divider panels for providing partitions between side-by-side compartments in the interior chamber of the main box being respectively partially and fully slidably removed from the main box.
Figure 3A:
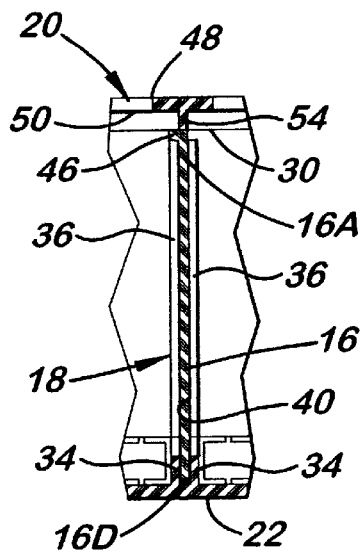
FIG. 3A is an enlarged fragmentary detailed view of the portion of the assembly of FIG. 3 enclosed by oval 3A.
Figure 4:
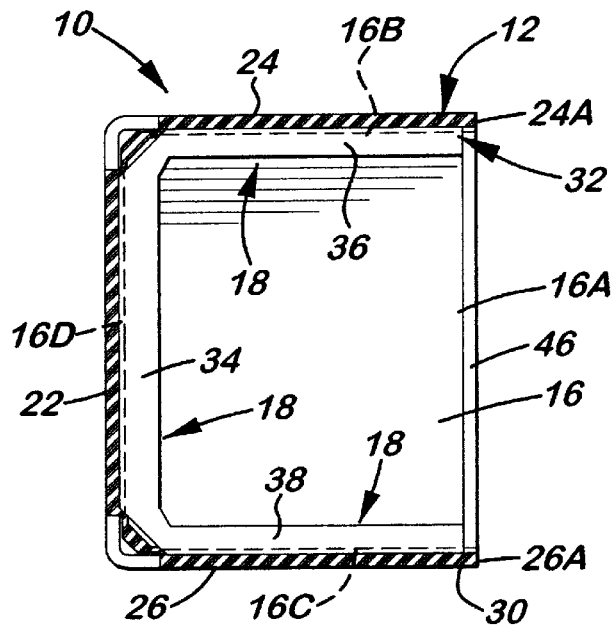
FIG. 4 is an enlarged cross-sectional view of the assembly taken along line 4—4 of FIG. 3 showing one of the divider panels installed in the interior chamber of the main box.
Figure 5:
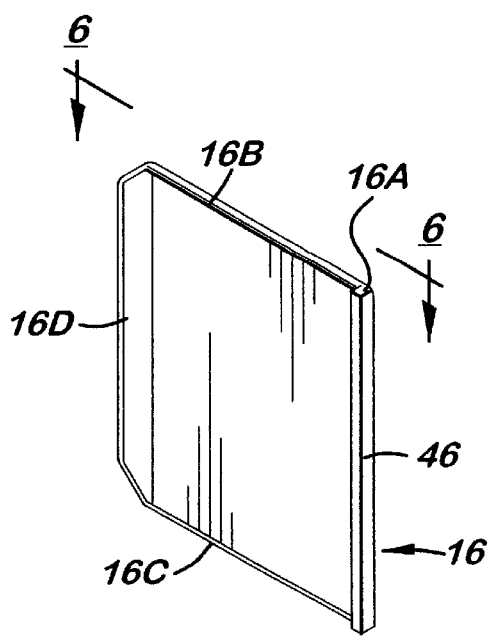
FIG. 5 is an enlarged perspective view of the one removed divider panel of FIG. 1.
Figure 6:
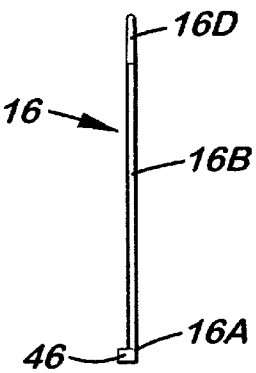
FIG. 6 is a top plan view of the divider panel as seen along line 6—6 of FIG. 5.
Figures 7, 8, 9:
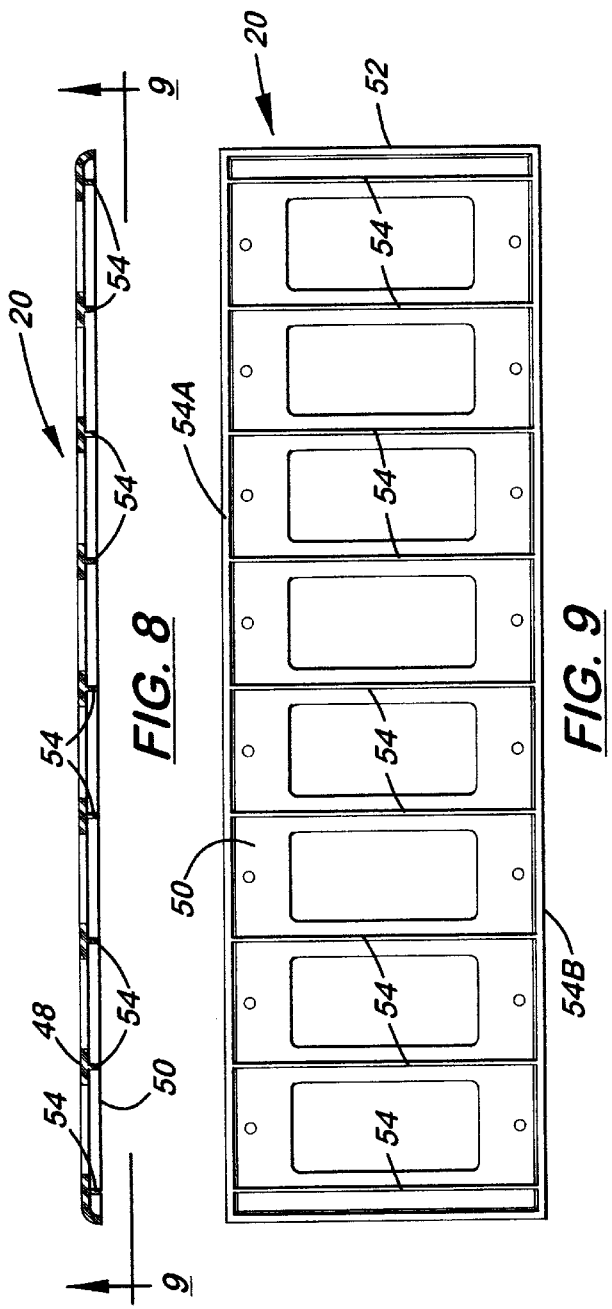
FIG. 7 is a front elevational view of the front cover plate of the assembly of FIG. 1.
FIG. 8 is a longitudinal sectional view of the front cover plate taken along line 8—8 of FIG. 7.
FIG. 9 is a rear elevational view of the front cover plate of the assembly as seen along line 9—9 of FIG. 8.
Figure 10:
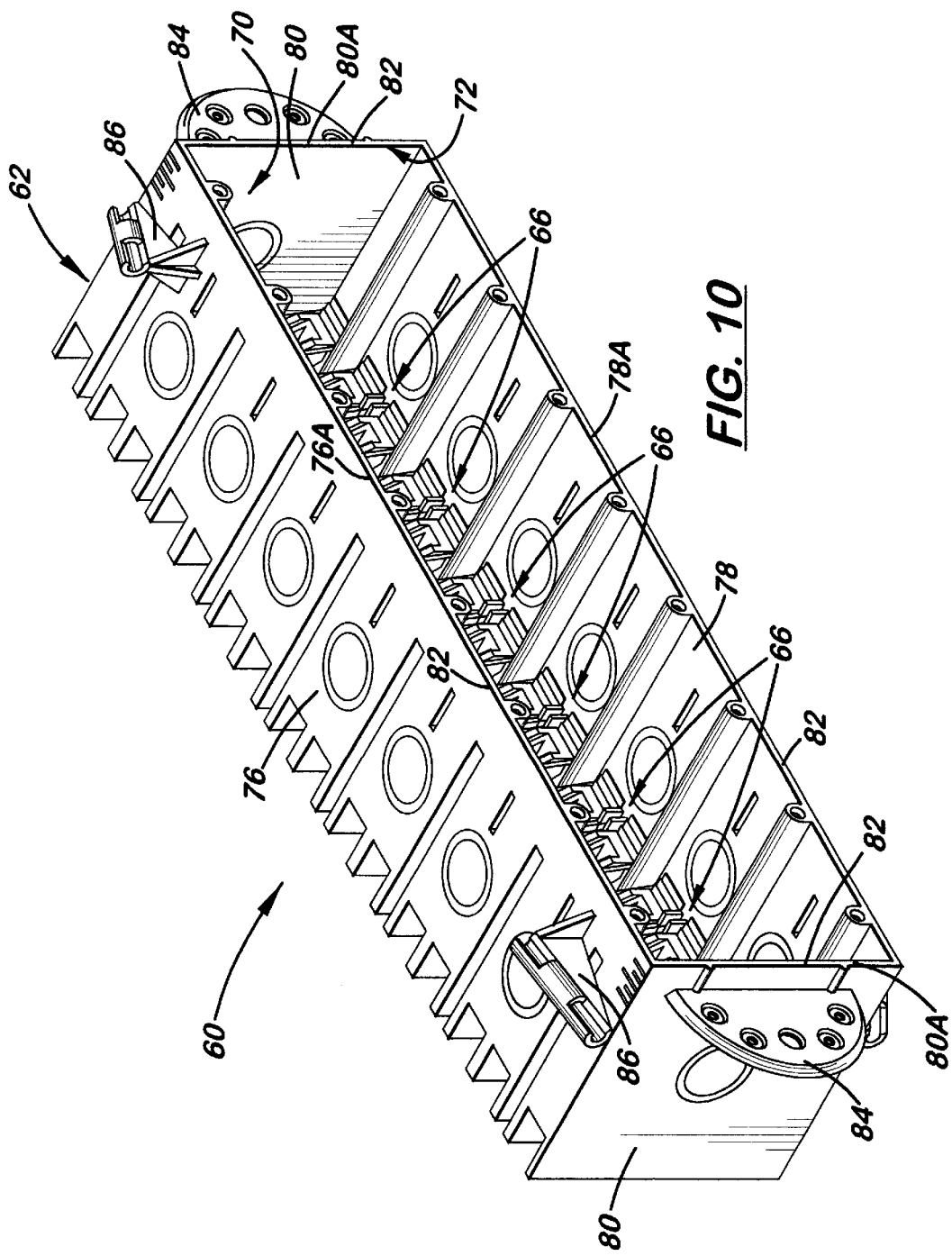
FIG. 10 is a front perspective view of a main box of a second embodiment of a multi-gang box assembly having elements constituting the invention of a copending patent application assigned to the same assignee as the present invention and also having a plurality of wire clamping devices of the present invention.
Figure 11:
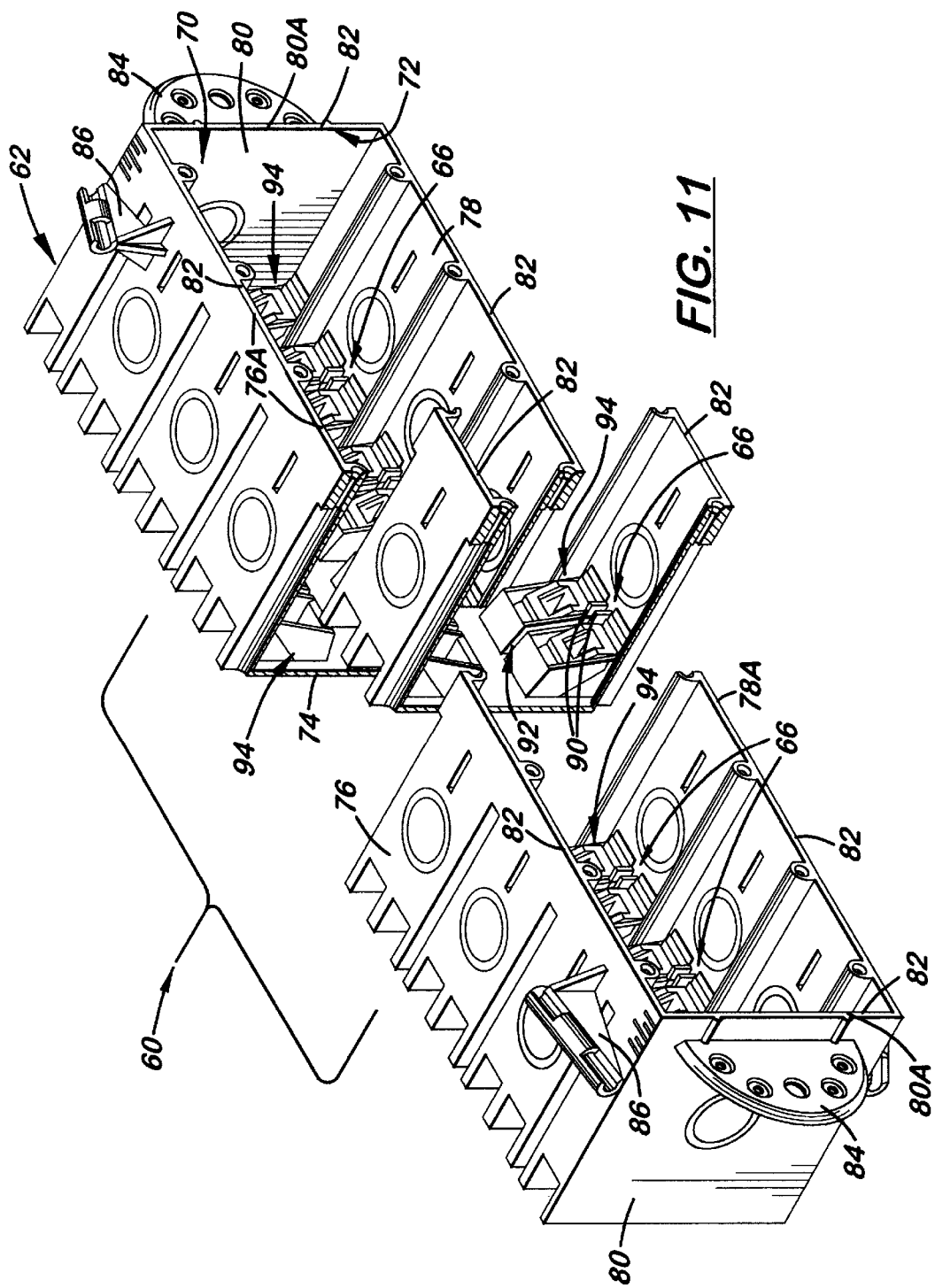
FIG. 11 is a front perspective view similar to that of FIG. 10 but showing the main box with a central section thereof broken out.
Figure 12:
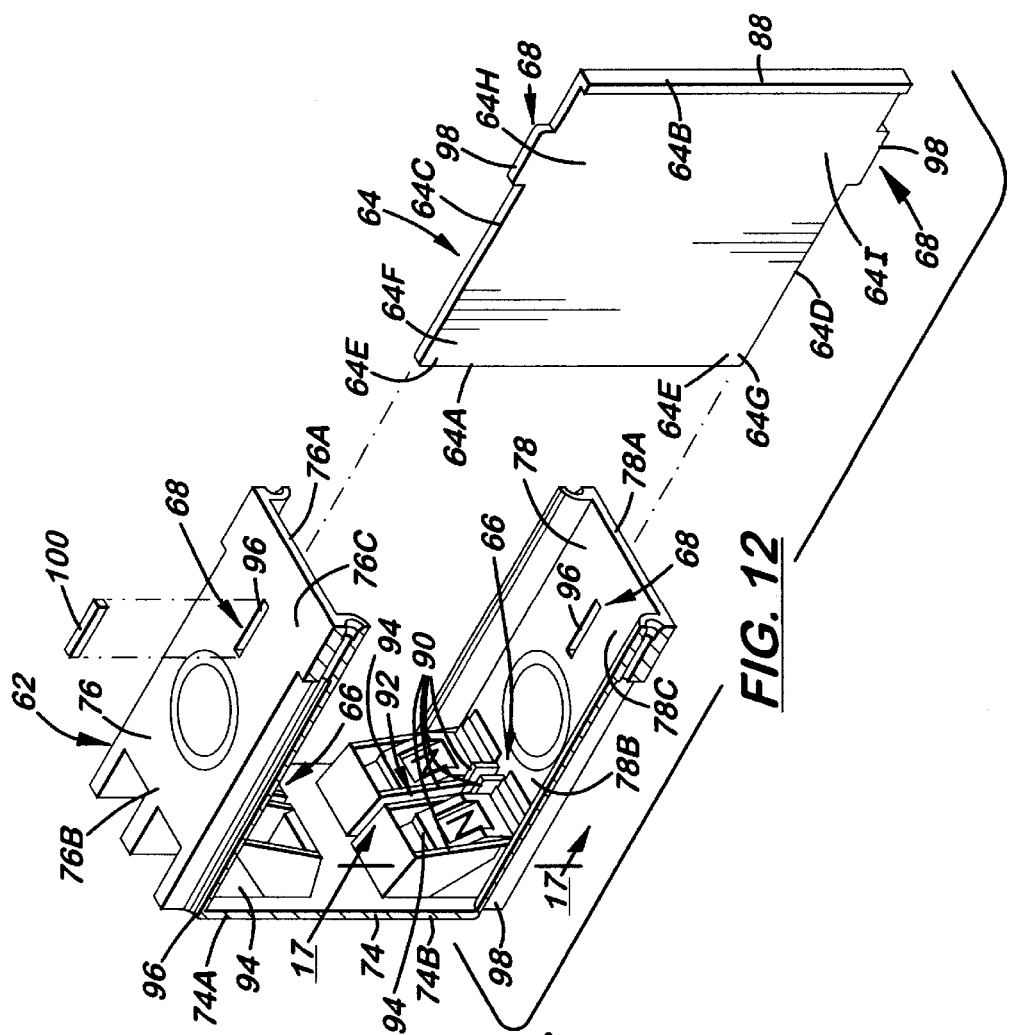
FIG. 12 is an enlarged perspective view of the broken out central section of the main box of FIG. 11 with one divider panel of the assembly shown removed from the main box to show a pair of the wire clamping devices of the present invention.

Referring to the drawings and particularly to FIGS. 1 to 3, there is illustrated a first embodiment, of a multiple gang junction box assembly, generally designated 10, constituting the invention of the above-cited original patent application. The assembly 10 basically includes a main box 12 having an interior chamber 14, a plurality of divider panels 16 separable from the main box 12, a plurality of positioning elements 18 attached to the main box 12 in the interior chamber 14 for slidably receiving and positioning the divider panels 16 in the interior chamber 14, and a front cover plate 20 separable from the main box 12 and divider panels 14. As an example, the main box 12, divider panels 16, positioning elements 18 and front cover plate 20 can be made of a conventional plastic material and manufactured by conventional injection molding techniques. While the main box 12 can have any desired size, one example is a length of fourteen and one-half inches so that the main box 12 can be fitted between two sixteen-inch on-center studs (not shown).

More particularly, the main box 12 of the assembly 10 includes a rear wall 22, a top wall 24, a bottom wall 26 and a pair of opposite side walls 28. The rear, top, bottom and side walls 22, 24, 26, 28 are integrally interconnected so as to form the interior chamber 14 of the box 12 and provide the box 12 with a generally rectangular configuration. The top, bottom and opposite side walls 24, 26, 28 have respective forward edge portions 24A, 26A, 28A which together form a front peripheral edge 30 of the main box 12 defining a front opening 32 to the interior chamber 14. Tabs 33 integrally attached to and extending above and below side walls 28 can be employed to secure the main box 12 to the studs.

The plurality of positioning elements 18 preferably are in the form of a plurality of laterally spaced apart sets of pairs of spaced apart rear, top and bottom ledges 34, 36, 38 integrally attached on and extending along the interiors of the rear, top and bottom walls 22, 24, 26 of the main box 12 between the rear wall 22 and the front peripheral edge 30 thereof. The pairs of spaced apart rear, top and bottom ledges 34, 36, 38 are attached one pair to the next and extend into the interior chamber 14. Also, the pairs of spaced apart rear, top and bottom ledges 34, 36, 38 of each set are aligned with one another and together define a C-shaped channel 40 therebetween located in the interior chamber 14 which slidably receives and positions one of the divider panels 16 in the interior chamber 14 so as to laterally space apart the divider panels 16 from one another through a given displacement "a". The divider panels 16 and ledges 34, 36, 38 solidly partition the interior chamber 14 into a plurality of side-by-side compartments 42 provided in a condition of electrical arcing isolation from one another. The isolated compartments 42 allow low electrical voltage components, such as light switches and volume controls 44, and high electrical voltage (110 VAC) components (not shown) to be housed in the adjacent compartments 42.

Each of the divider panels 16 of the assembly 10 has a front edge portion 16A thereon. Each of the divider panels 16 further has a top edge portion 16B, a bottom edge portion 16C and a rear edge portion 16D which preferably are thinner than the remainder of the divider panel 16 to facilitate insertion of the divider panel 16 into the channel 40. The front edge portion 16A of each divider panel 16 preferably has a front flange 46 formed thereon which extends transversely in relation to the remainder of the divider panel 16 and has a width greater than the thickness of the divider panel 16. The front flange 46 of each divider panel 16 extends in one direction, and transversely, in relation to the remainder of the divider panel 16 and has a width greater than the thickness of the divider panel 16.

The front cover plate 20 of the assembly 10 has opposite front and rear sides 48, 50, a peripheral edge 52 and a plurality of vertical lands 54 formed on and protruding from the rear side 50 of the front cover plate 20. The vertical lands 54 are laterally spaced apart from one another by a given distance "b". The given displacement "a" of the divider panels 16 from one another in the interior chamber 14 is substantially equal to a predetermined number of times the given distance "b" of the vertical lands 54 from one another. The given displacements "a" of the divider panels 16 from one another is preferably substantially equal to two times the given distance "b" of the vertical lands 54 from one another. The vertical lands 54 also extend between and interconnect top and bottom portions 52A, 52B of the peripheral edge 52 of the front cover plate 20. When the front cover plate 20 is positioned adjacent to the front peripheral edge 30 of the main box 12 and attached to the main box 12 using any suitable known technique so as to cover the front opening 32 thereof, flat surfaces 54A of some of the vertical lands 54 of the front cover plate 20, such as every other land 54, and flat surfaces 46A of the front flanges 46 of the divider panels 16 are placed in flush contact with one another. :Such flush contact between the flat surfaces 54A, 46A closes off adjacent ones of the side-by-side compartments 42 from one another at the front flanges 46 of the divider panels 16 and thereby provides additional electrical arcing isolation of the side-by-side compartments 42 from one another. The width of the front flange 46 of each of the divider panels 16 also is greater than the width of the one of the vertical lands 54 of the front cover plate 20 such that the land 54 can be somewhat misaligned with the divider panel 16 in the lengthwise direction of the main box 12 and still be in flush contact with the front flange 46 on the respective divider panel 16. This width difference between the front flanges 46 and lands 54 accommodates component tolerance and mounting variations.

Figure 13:
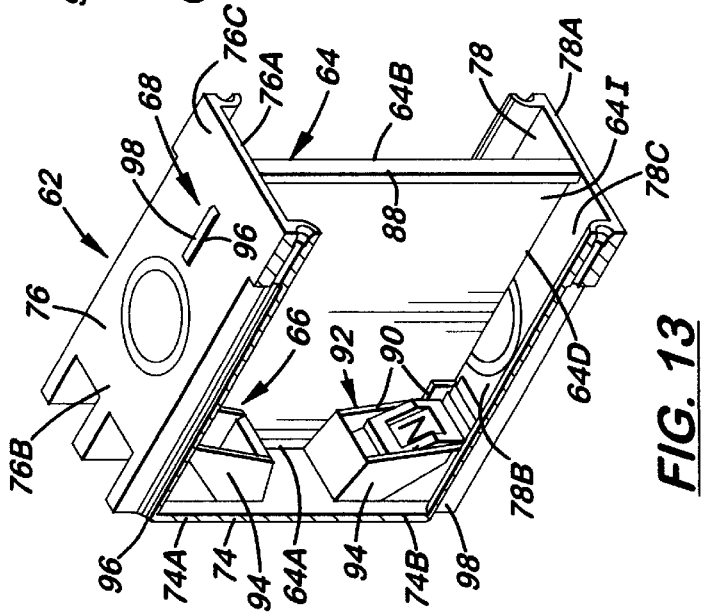
FIG. 13 is an enlarged perspective view of the broken out central section of the main box of FIG. 11 with the one divider panel of the assembly installed and locked in place in the main box.

Referring now to FIGS. 10–13, there is illustrated a second embodiment of a multiple gang junction box assembly, generally designated 60, having elements constituting the invention of a copending patent application assigned to the same assignee as the present invention and also having a plurality of wire clamping devices, generally designated 94, constituting the present invention. The assembly 60 basically includes a main box 62, a plurality of divider panels 64 (only one of which being shown in FIGS. 12 and 13), first and second pluralities of positioning elements 66, 68 for receiving and positioning the divider panels 64 in an interior chamber 70 of the main box 62 so as to laterally space apart the divider panels 64 in lockable positions (as seen in FIG. 13) in the main box 62 and to partition the interior chamber 70 into a plurality of side-by-side compartments, and a front cover plate 20 (being identical to the front cover plate of the first embodiment and thus identified by the same reference numeral) for covering a front opening 72 of the main box 62. As an example, the main box 62, divider panels 64 and front, cover plate 20 can be made of a conventional plastic material and manufactured by conventional injection molding techniques. While the main box 62 can have any desired size, one example is a length of fourteen and one-half inches so that the main box 62 can be fitted between two sixteen-inch on-center studs (not shown). The first and second pluralities of positioning elements, 66, 68 constitute the invention of the aforementioned copending patent application assigned to the same assignee as the present invention.

More particularly, similar to the main box 12 of the assembly 10, the main box 62 of the assembly 60 includes a rear wall 74, a top wall 76, a bottom wall 78 and a pair of opposite side walls 80. The rear, top, bottom and opposite side walls 74, 76, 78, 80 are integrally interconnected so as to form the interior chamber 70 and provide the main box 12 with a generally rectangular configuration. The top, bottom and opposite side walls 76, 78, 80 have respective forward edges 76A, 78A, 80A which together form a front peripheral edge 82 of the main box 62 defining the front opening 72 to the interior chamber 70. Brackets 84, 86 integrally attached to and extending from the top wall 76 and opposite side walls 80 can be employed to secure the main box 62 to the studs.

The plurality of divider panels 64 of the assembly 60 are separable from the main box 62 and each divider panel 64 has opposite rear and front edges 64A, 64B and upper and lower edges 64C, 64D which extend between the rear and front edges 64A, 64B. The divider panels 64 of the assembly 60 are generally similar to the divider panels 16 of the assembly 10 except for the presence of parts of the second plurality of positioning elements 68 on the divider panels 64. The front cover plate 20, as employed in the assembly 60, is separable from the main box 62 and the divider panels 64, has the opposite front and rear sides 48, 50 and is attachable to the main box 64 such that the rear side 50 of the front cover plate 20 covers the front opening 72 of the main box 62 and vertical lands 54 formed on and protruding from the rear-side 50 of the front cover plate 20 are capable of making flush contact with front flanges 88 on the front edges 64B of the divider panels 64, the same as shown in FIG. 3 and earlier described in the case of the assembly 10, so as to close off the side-by-side compartments from one another at the front edges 64B of the divider panels 64 when the divider panels 64 are in the locked positions in the.main box 62.

The first plurality of positioning elements 66 of the assembly 60 are disposed in the interior chamber 70 on either or both of upper and lower portions 74A, 74B of the rear wall 74 and rear portions 76B, 78B of the top and bottom walls 76, 78 of the main box 62. More particularly, the first plurality of positioning elements 66 includes laterally spaced apart sets of upper and lower pairs of spaced apart ledges 90 attached on and extending along either or both of the upper and lower portions 74A, 74B of the rear wall 74 and rear portions 76B, 78B of the top and bottom walls 76, 78 of the main box 62. The ledges 90 extend toward and end at a location spaced rearwardly from the front peripheral edge 72 of the main box 62 such that upper and lower pairs of ledges 90 of each set thereof define guide channels 92 therebetween being aligned with one another so as to removably receive in the aligned guide channels either or both of segments 64E of the rear edge 64A and segments 64F, 64G of the upper and lower edges 64C, 64D of one of the divider panels 64 when the divider panel 64 is installed in the locked position in the main box 62, as seen in FIG. 13. The guide ledges 90 are formed by spaced apart facing sides of upper and lower pairs of the wire clamping devices 94 disposed in the interior chamber 70 and integrally attached on and protruding forwardly from upper and lower rear corners 96, 98 of the main box 62 formed by upper and lower portions 74A, 74B of the rear wall 74 and rear portions 76B, 78B of the top and bottom walls 76, 78 of the main box 62.

The second plurality of positioning elements 68 of the assembly 60 are disposed on intermediate portions 64H, 64I of the upper and lower edges 64C, 64D of the divider panels 64 and on intermediate portions 76C, 78C of the top and bottom walls 76, 78 of the main box. 62 and spaced forwardly from the first plurality of positioning elements 66. More particularly, the second plurality of positioning elements 68 includes a plurality of spaced apart pairs of slots 96 and a plurality of pairs of lock tabs 98. Each of the pairs of slots 96 are defined in the intermediate portions 76C, 78C of the top and bottom walls 76, 78 of the main box 62 such that each of the pairs of slots 96 is spaced forwardly from and aligned with the guide channels 92 between the upper and lower pairs of ledges 90 of a respective one set of the first positioning elements 66. Each of the slots 96 is located closer to the front peripheral edge 82 of the main box 62 than to the rear wall 74 thereof. The slots 96 are substantially covered by breakaway tabs 100 detachably attached to the intermediate portions 76C, 78C of the respective top and bottom walls 76, 78 of the main box 62 and are capable of detachment therefrom prior to insertion of the respective divider panels 64 in the interior chamber 70 of the main box 62. Each of the pairs of lock tabs 98 are defined on and protrude in opposite directions from the intermediate portions 64H, 64I of the upper and lower edges 64C, 64D of one of the divider panels 64 and are spaced from the opposite rear and front edges 64A, 64B of the divider panel 64 such that the lock tabs 98 of the one divider panel 64 insert into the one of the pairs of slots 96 on the top and bottom walls 76, 78 of the main box 62 when the divider panel 64 is installed in the locked position in the main box 62, as seen in FIG. 13. Each of the pairs of lock tabs 98 is located closer to the front edge 64B of the one of the divider panels 64 than to the rear edge 64A thereof. The top and bottom walls 76, 78 of the main box 62 are sufficiently bendable or flexible so as to allow insertion and removal of the divider panels 64 to and from the locked position in the interior chamber 70 of the main box 62.

Referring now to FIGS. 10–19, there is illustrated the plurality of wire clamping devices 94 in the second embodiment of the multiple gang junction box assembly 60 which constitute the present invention. The term "wire" is being used in a broad generic sense and not as a term of limitation. The clamping devices 94 are disposed in the interior chamber 70 of the main box 62 and are attached to the main box 62. The clamping devices 94 are arranged into first and second groups thereof. In the first group, the clamping devices 94 are spaced apart from one another, aligned in a first row and attached to the rear and bottom walls 74, 78 of the main box 62. In the second group, the clamping devices 94 are spaced apart from one another, aligned in a second row and attached to the rear and top walls 74, 76 of the main box 62.

Figure 16:
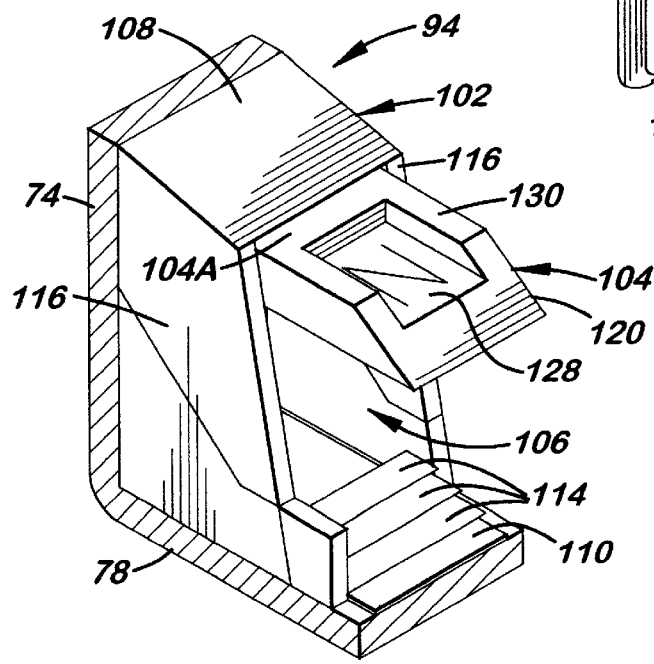
FIG. 16 is a front perspective view of the one clamping device of FIG. 14 now showing the clamp member in a fully extended condition relative to the clamp housing structure and an entry passage through the clamp housing structure.
Figure 19:
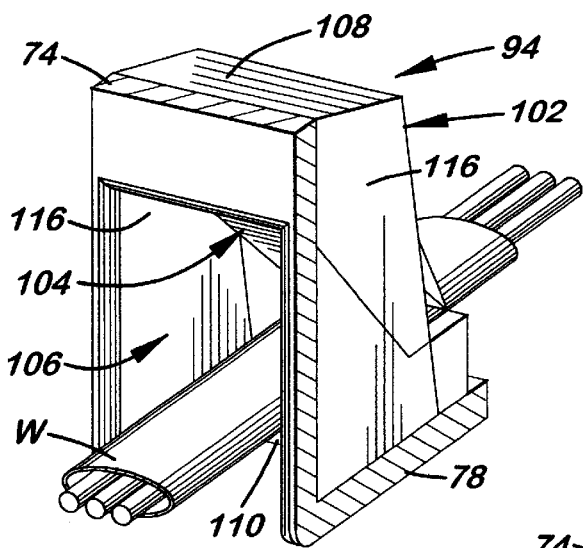
FIG. 19 is a rear perspective view of the clamping device of FIG. 18.
Figure 17:
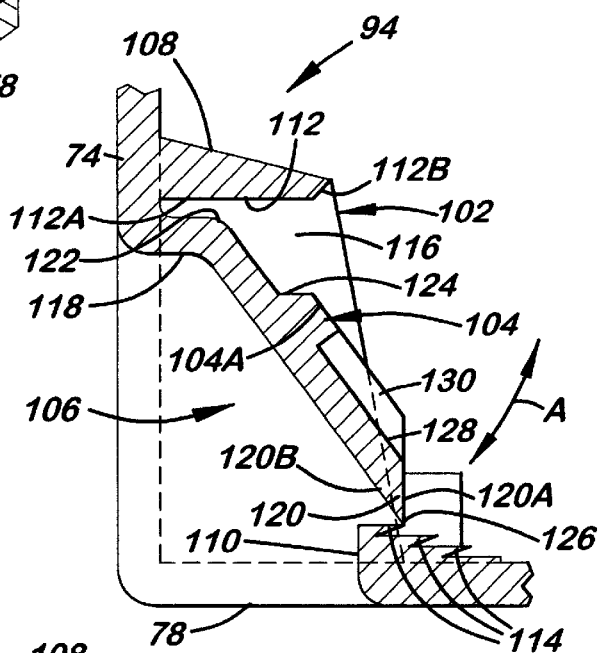
FIG. 17 is a longitudinal sectional view taken along line 17—17 of FIG. 12 showing the clamp member in the initial closed condition relative to the clamp housing structure.
Figure 18:
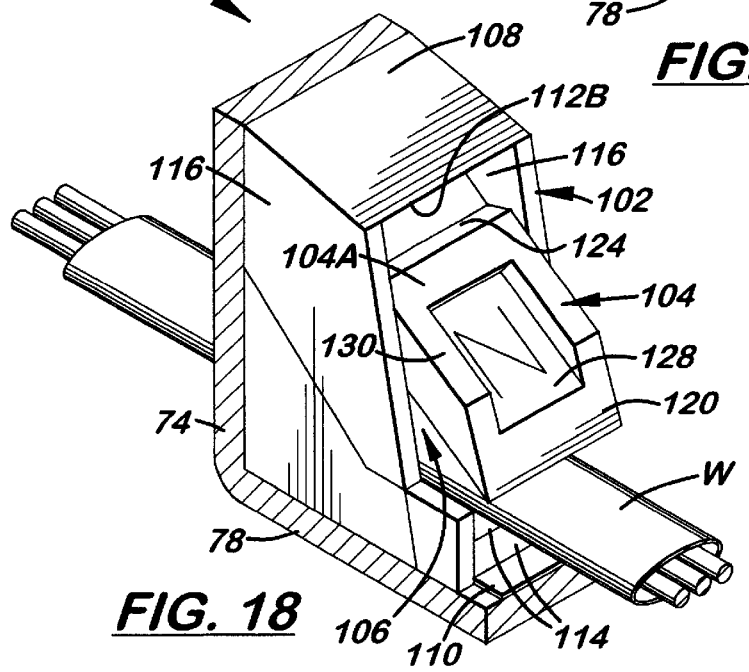
FIG. 18 is a front perspective view of the clamping device similar to that of FIG. 14 but now showing a wire pushed through the entry passage of the device and the clamping member engaging the wire and forcing the wire downward against forwardly projecting barbs on the clamp housing structure so as to prevent pulling or extracting of the wire out of the passage from the back of the device.

More particularly, each clamping device 94 includes a clamp housing structure 102 and a clamp member 104. The housing structure 102 of each clamp device 94 is attached to the rear and bottom walls 74, 78 of the main box 62 so as to define a passage 106 through the main box 62 for entry of a wire W, as seen in FIGS. 18 and 19, into the interior chamber 70 of the main box 62. Each housing structure 102 has upper and lower portions 108, 110 located above and below the passage 106. The upper portion 108 of each housing structure 102 defines an abutment surface 112 spaced above the lower portion 110. The abutment surface 112 has a first segment 112A disposed adjacent to the rear wall 74 of the main box 62 and a second segment 112B spaced from the first segment 112A away from the rear wall 74 of the main box 62. The lower portion 110 of each housing structure 102 defines at least one and preferably a plurality of outwardly protruding barbs 114 having a stairstep configuration in cross-section, as seen in FIGS. 14 and 16–18.

The housing structure 102 of each clamping device 94 also has a pair of opposite walls 116 attached to the main box 62 and protruding into the interior chamber 70 thereof so as to define the passage 106 between the opposite walls 116. The opposite walls 116 in the first group of clamping devices 94 are attached to the rear and bottom walls 74, 78 of the main box 62 and in the second group of clamping devices 94 are attached to the rear and top walls 74, 76 of the main box 62. The upper portion 108 of each housing structure 102 extends between and interconnects upper portions of the opposite walls 116 and the lower portion 110 of each housing structure 102 extends between and interconnects lower portions of the opposite walls 116.

Figure 14:
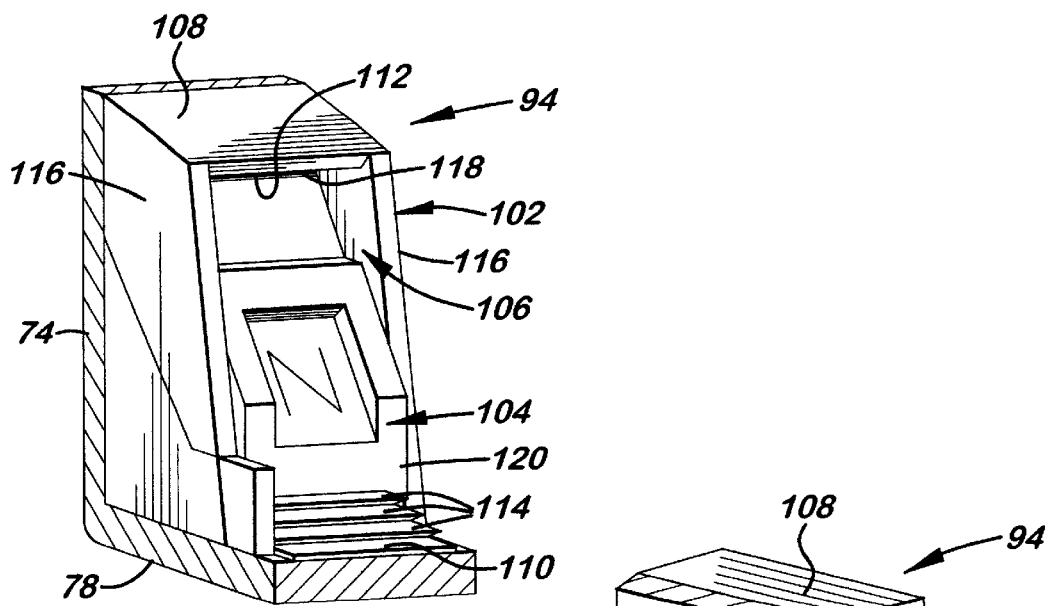
FIG. 14 is an enlarged front perspective view of one of the wire clamping devices broken away from the, main box and showing a clamp member of the clamping device in an initial closed condition relative to a clamp housing structure of the clamping device.
Figure 15:
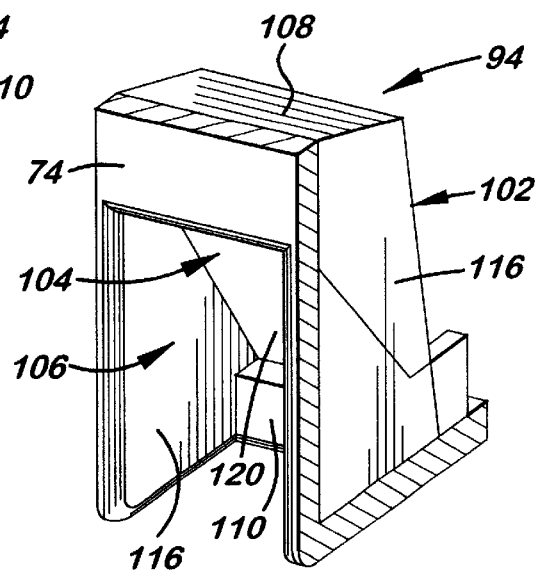
FIG. 15 is a rear perspective view of the clamping device of FIG. 14.

The clamp member 104 of each clamping device 94 is disposed in the housing structure 102 across the passage 106 therethrough. Each clamp member 104 has upper and lower ends 118, 120 and is attached at the upper end 118 to the rear wall 74 of the main box 62 at a location adjacent to the upper portion 108 of the housing structure 102 and spaced from the abutment surface 112 thereof. Each clamp member 104 is not attached at its opposite sides to the opposite walls 116 of the housing structure 102 but may be initially attached at its lower end 120 to one of the barbs 114. Such latter attachment is easily fractured by inserting an instrument, such as a screwdriver, through the passage 106. The clamping devices 94, as with the main box 62, are made of a suitable plastic material such that each clamp member 104 is adapted to flexably bend at its upper end 118 so as to enable the clamp member 104 to hingedly pivot about its upper end 118 relative to the rear wall 74 of the main box 62 and undergo pivotal movement, along double arrow line A in FIG. 17, between a closed position, as seen in FIGS. 14, 15 and 17, and an open position, as seen in FIGS. 16, 18 and 19, relative to the passage 106. In the open position, the clamp member 104 at its lower end 120 has moved away from the barbs 114 defined by the lower portion 110 of the housing structure 102. The clamp member 104 is positioned relative to the upper portion 108 of the housing structure 102 so as to yieldably bias the clamp member 104 to move toward the barbs 114 when the clamp member 104 is caused to flexably bend away from the barbs 114 in response to the wire W being pushed into the main box 62 through the passage 106 from outside of the interior chamber 70 thereof such that the lower end 120 of the clamp member 104 and the barbs 114 assume a locking condition, as seen in FIGS. 18 and 19, relative to the wire W that prevents the wire W from thereafter being pulled back through the passage 106 from the interior chamber 70 of the main box 62.

The clamp member 104 of each clamping device 94 also has an upper portion 122 located adjacent to the upper end 118 of the clamp member 104 and positioned relative to the upper portion 108 of the clamp housing structure 102 such that the upper portion 122 of the clamp member 104 is engagable with the first segment 112A of the abutment surface 112 on the upper portion 108 of the housing structure 102 so as to yieldably bias the clamp member 104 to move toward the barbs 114 defined by the lower portion 110 of the housing structure 102 when the clamp member 104, after the upper portion 122 thereof engages the first segment 112A of the abutment surface 112, is further caused to flexably bend away from the barbs 114 in response to the wire W being pushed into the main box 62 through the passage 106 of the clamp housing structure 102 from outside of the interior chamber 70 such that the lower end 120 of the clamp member 104 and the barb 114 then assume the locking condition relative to the wire W that prevents the wire W from thereafter being pulled back through the passage 106 from the interior chamber 70 of the main box 62. The clamp member 104 of each clamping device 94 further has an intermediate portion 124 located between and spaced from the upper portion 122 and lower end 120 of the clamp member 104 such that the intermediate portion 124 can engage the second segment 112B of the abutment surface 112 defined by the upper portion 108 of the clamp housing structure 102 so as to set the limits of full extension or bending of the clamp member 104 relative to the housing structure 102, as seen in FIG. 16, away from the barbs 114 defined by the lower portion 110 of the clamp housing structure 102. Further, the lower end 120 of the clamp member 104 is formed by front and rear edge portions 120A, 120B thereon which converge toward one another and terminate as a pointed edge 126 on the lower end 120 of the clamp member 104. Also, each clamp member 104 has a front face 104A with a recess 128 defined therein so as to form a U-shaped raised area 130 on the front face 104A of the clamp member 104 providing the clamp member 104 with sufficient structural rigidity such that the clamp member 104 flexably bends only at the upper end thereof.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A multiple gang junction box assembly, comprising:
   (a) a main box having an interior chamber and a front peripheral edge defining a front opening to said interior chamber; and
   (b) a plurality of wire clamping devices disposed in said interior chamber of said main box and attached to said main box, each of said clamping devices including
      (i) a clamp housing structure attached to said main box and disposed in said interior chamber thereof so as to define a passage through said main box for entry of a wire into said interior chamber of said main box, said clamp housing structure having upper and lower portions located above and below said passage, said lower portion defining at least one outwardly protruding barb, said upper portion defining an abutment surface spaced above said lower portion, said abutment surface having a first segment disposed adjacent to said main box and a second segment spaced from said first segment away from said main box, and
      (ii) a clamp member disposed in said clamp housing structure across said passage therethrough, said clamp member having upper and lower ends and being attached at said upper end of said clamp member to said main box at a location adjacent to said upper portion of said clamp housing structure such that said clamp member is adapted to flexably bend at said upper end thereof so as to enable said clamp member to undergo pivotal movement from a closed position toward an open position relative to said passage in which said clamp member at said lower end thereof is moved away from said barb defined by said lower portion of said clamp housing structure, said clamp member also having an upper portion located adjacent to said upper end of said clamp member and being positioned relative to said upper portion of said clamp housing structure such that said upper portion of said clamp member is engagable with said first segment of said abutment surface on said upper portion of said clamp housing structure so as to yieldably bias said clamp member to move toward said barb when said clamp member is caused to flexably bend away from said barb in response to a wire being pushed into said main box through said passage of said clamp housing structure from outside of said interior chamber thereof such that said lower end of said clamp member and said barb assume a locking condition relative to the wire that prevents the wire from thereafter being pulled back through said passage from said interior chamber of said main box, said clamp member further having an intermediate portion located between and spaced from said upper portion and said lower end of said clamp member such that said intermediate portion of said clamp member will engage said second segment of said abutment surface on said upper portion of said clamp housing structure so as to set the limit of bending of said clamp member relative to said housing structure away from said barb defined by said lower portion of said clamp housing structure.

2. The assembly of claim 1 wherein said main box includes rear, top, bottom and opposite side walls interconnected so as to form said interior chamber and said front peripheral edge defining said front opening to said interior chamber.

3. The assembly of claim 2 wherein said plurality of wire clamping devices includes a first group of said devices being spaced apart from one another and aligned in a first row and attached to said rear and bottom walls of said main box.

4. The assembly of claim 3 wherein said plurality of wire clamping devices includes a second group of said devices being spaced apart from one another and aligned in a second row and attached to said rear and top walls of said main box.

5. The assembly of claim 1 wherein said clamp housing structure of each of said clamping devices also has a pair of opposite walls attached to said main box and protruding into said interior chamber thereof so as to define said passage between said opposite walls.

6. The assembly of claim 5 wherein said upper portion of said clamp housing structure extends between and interconnects upper portions of said opposite walls.

7. The assembly of claim 5 wherein said lower portion of said clamp housing structure extends between and interconnects lower portions of said opposite walls.

8. The assembly of claim 1 wherein said lower end of said clamp member is formed by front and rear edge portions thereon which converge toward one another and terminate as a pointed edge on said clamp member.

9. The assembly of claim 1 wherein said clamp member has a face with a recess defined therein so as to form a U-shaped raised area on said face of said clamp member providing said clamp member with sufficient structural rigidity such that said clamp member flexably bends only at said upper end thereof.

10. The assembly of claim 1 wherein said lower portion of said clamp housing structure defines a plurality of outwardly protruding barbs having a stairstep configuration in cross-section.

11. A multiple gang junction box assembly, comprising:
(a) a main box having rear, top, bottom and opposite side walls interconnected so as to form an interior chamber and a front peripheral edge defining a front opening to said interior chamber;
(b) a plurality of divider panels removably receivable through said front opening of said main box into said interior chamber thereof in laterally spaced apart positions therein so as to partition said interior chamber into a plurality of side-by-side compartments;
(c) a front cover plate detachably attachable to said main box so as to cover said front opening of said main box and close off said side-by-side compartments from one another at front edges of said divider panels when said divider panels are received in said main box; and
(d) a plurality of wire clamping devices disposed in said interior chamber of said main box and attached to said main box, each of said clamping devices including
(i) a clamp housing structure attached to said main box and disposed in said interior chamber thereof so as to define a passage through said main box for entry of a wire into said interior chamber of said main box, said clamp housing structure having upper and lower portions located above and below said passage, said lower portion defining at least one outwardly protruding barb, said upper portion defining an abutment surface spaced above said lower portion, said abutment surface having a first segment disposed adjacent to said main box and a second segment spaced from said first segment away from said main box, and
(ii) a clamp member disposed in said clamp housing structure across said passage therethrough, said clamp member having upper and lower ends and being attached at said upper end of said clamp member to said main box at a location adjacent to said upper portion of said clamp housing structure and spaced from said abutment surface thereof such that said clamp member is adapted to flexably bend about said upper end thereof so as to enable said clamp member to undergo pivotal movement from a closed position toward an open position relative to said passage in which said lower end of said clamp member is moved away from said barb defined by said lower portion of said clamp housing structure, said clamp member also having an upper portion located adjacent to said upper end of said clamp member and positioned relative to said upper portion of said clamp housing structure such that said upper portion of said clamp member is engagable with said first segment of said abutment surface on said upper portion of said clamp housing structure so as to yieldably bias said clamp member to move toward said barb defined by said lower portion of said clamp housing structure when said clamp member, after said upper portion thereof engages said first segment of said abutment surface, is further caused to flexably bend away from said barb in response to the wire being pushed into said main box through said passage from outside of said interior chamber thereof such that said lower end of said clamp member and said barb then assume said locking condition relative to the wire that prevents the wire from thereafter being pulled back through said passage from said interior chamber of said main box, said clamp member further having an intermediate portion located between and spaced from said upper portion and said lower end of said clamp member such that said intermediate portion of said clamp member will engage said second segment of said abutment surface on said upper portion of said clamp housing structure so as to set the limit of bending of said clamp member relative to said housing structure away from said barb defined by said lower portion of said clamp housing structure.

12. The assembly of claim 11 wherein said plurality of wire clamping devices includes a first group of said devices being spaced apart from one another and aligned in a first row and attached to said rear and bottom walls of said main box.

13. The assembly of claim 12 wherein said plurality of wire clamping devices includes a second group of said devices being spaced apart from one another and aligned in a second row and attached to said rear and top walls of said main box.

14. The assembly of claim 11 wherein said clamp housing structure of each of said clamping devices also has a pair of opposite walls attached to said main box and protruding into said interior chamber thereof so as to define said passage between said opposite walls.

15. The assembly of claim 14 wherein said upper portion of said clamp housing structure extends between and interconnects upper portions of said opposite walls.

16. The assembly of claim 15 wherein said lower portion of said clamp housing structure extends between and interconnects lower portions of said opposite walls.

17. The assembly of claim 11 wherein said lower end of said clamp member is formed by front and rear edge portions thereon which converge toward one another and terminate as a pointed edge on said clamp member.

18. The assembly of claim 11 wherein said clamp member has a face with a recess defined therein so as to form a U-shaped raised area on said face of said clamp member providing said clamp member with sufficient structural rigidity such that said clamp member flexably bends only at said upper end thereof.

19. The assembly of claim 11 wherein said lower portion of said clamp housing structure defines a plurality of outwardly protruding barbs having a stairstep configuration in cross-section.

* * * * *